United States Patent
Boyapalle et al.

(10) Patent No.: US 11,928,479 B2
(45) Date of Patent: Mar. 12, 2024

(54) SYSTEMS AND METHODS FOR MANAGED PERSISTENCE IN WORKSPACES

(71) Applicant: Dell Products, L.P., Round Rock, TX (US)

(72) Inventors: Anantha K. Boyapalle, Cedar Park, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 252 days.

(21) Appl. No.: 17/523,404

(22) Filed: Nov. 10, 2021

(65) Prior Publication Data

US 2023/0144215 A1 May 11, 2023

(51) Int. Cl.
*G06F 9/445* (2018.01)
*G06F 8/61* (2018.01)
*H04L 9/08* (2006.01)

(52) U.S. Cl.
CPC .............. *G06F 9/445* (2013.01); *G06F 8/61* (2013.01); *H04L 9/0897* (2013.01)

(58) Field of Classification Search
CPC .......... G06F 9/445; G06F 8/61; G06F 9/4451; H04L 9/0897
See application file for complete search history.

(56) References Cited

U.S. PATENT DOCUMENTS

| | | | |
|---|---|---|---|
| 10,180,962 B1 * | 1/2019 | Kapoor | H04M 15/63 |
| 10,409,625 B1 * | 9/2019 | Suryanarayanan | G06F 8/656 |
| 11,080,041 B1 * | 8/2021 | Ah Kun | G06F 9/44505 |
| 11,196,714 B2 * | 12/2021 | Fleck | G06F 12/1408 |
| 2006/0070085 A1 * | 3/2006 | Bao | G06F 9/4418 |
| | | | 719/319 |
| 2006/0072748 A1 * | 4/2006 | Buer | H04L 9/0897 |
| | | | 380/44 |
| 2017/0169072 A1 * | 6/2017 | Crawford | G06F 11/1474 |
| 2017/0220235 A1 * | 8/2017 | Jayaraman | H04N 5/44504 |
| 2018/0032409 A1 * | 2/2018 | Surakanti | G06F 9/45558 |
| 2018/0109936 A1 * | 4/2018 | Ting | H04W 4/029 |
| 2020/0306638 A1 * | 10/2020 | Fear | A63F 13/67 |
| 2021/0176304 A1 * | 6/2021 | Muthiah | H04L 67/1021 |
| 2023/0073463 A1 * | 3/2023 | Agarwal | G06F 16/258 |

* cited by examiner

*Primary Examiner* — Faisal M Zaman
(74) *Attorney, Agent, or Firm* — Fogarty LLP

(57) ABSTRACT

Systems and methods for managing persistence in workspaces are described. The system for managing workspaces includes computer-executable instructions for instantiating a workspace in response to receiving a login request, creating a base OS layer in the workspace, and installing one or more applications onto the base OS layer in which the applications have been installed on the workspace of a previous login session. The system may then virtually map application data to the memory of the workspace to be used by the applications in which the application data was generated by the applications during the previous login session of the workspace.

17 Claims, 4 Drawing Sheets

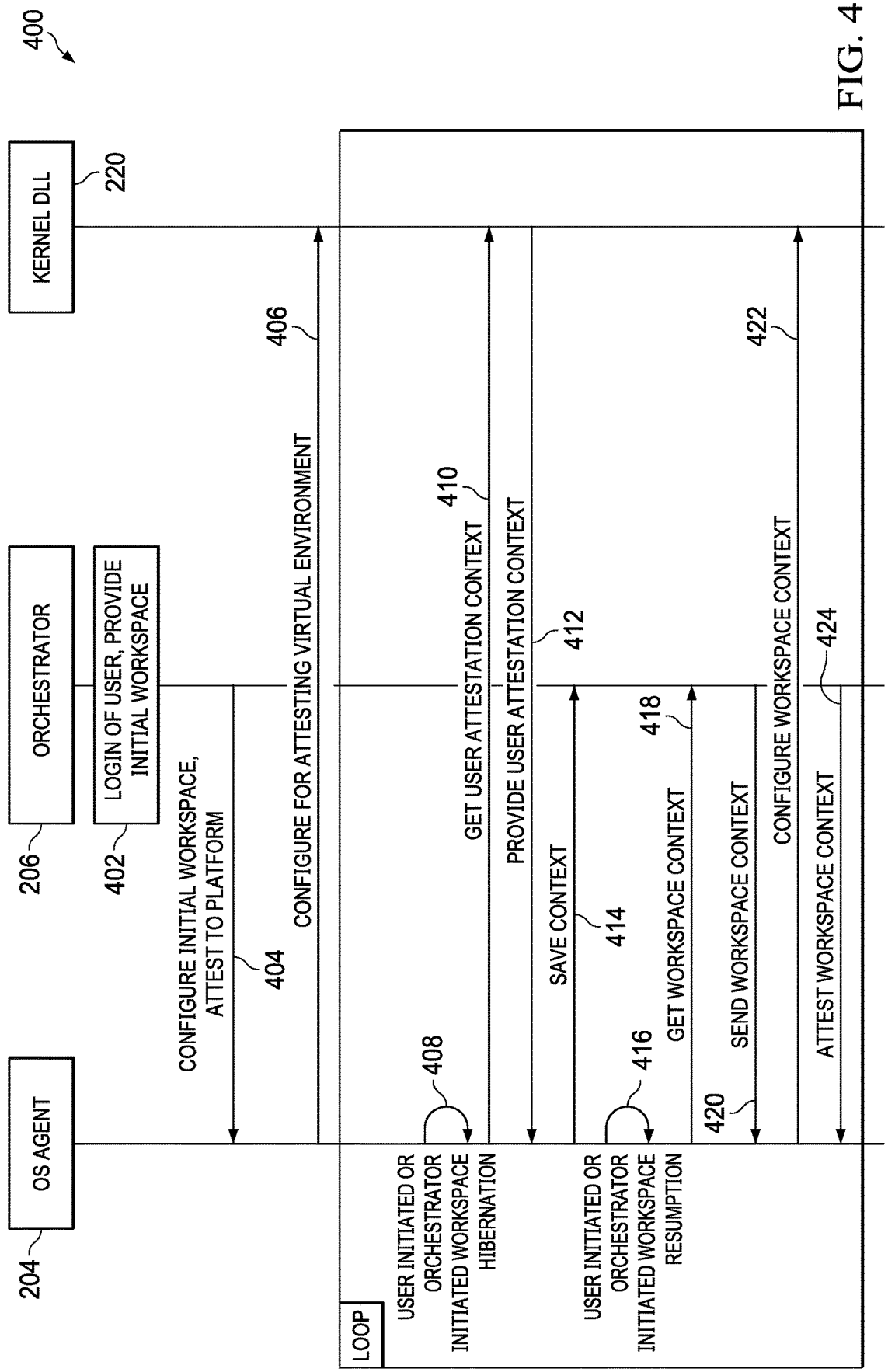

SYSTEMS AND METHODS FOR MANAGED PERSISTENCE IN WORKSPACES

FIELD

This disclosure relates generally to Information Handling Systems (IHSs), and, more specifically, to a system and method for managed persistence in workspaces.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs provide users with capabilities for accessing, creating, and manipulating data. IHSs often implement a variety of security protocols in order to protect this data during such operations. A known technique for securing access to protected data that is accessed via an IHS is to segregate the protected data within an isolated software environment that operates on the IHS, where such isolated software environments may be referred to by various names, such as virtual machines, containers, dockers, etc. Various types of such segregated environments are isolated by providing varying degrees of abstraction from the underlying hardware and operating system of the IHS. These virtualized environments typically allow a user to access only data and applications that have been approved for use within that particular isolated environment. In enforcing the isolation of a virtualized environment, applications that operate within such isolated environments may have limited access to capabilities that are supported by the hardware and operating system of the IHS.

SUMMARY

Systems and methods for managing persistence in workspaces are described.

According to one embodiment, the system for managing workspaces includes computer-executable instructions for instantiating a workspace in response to receiving a login request, creating a base OS layer in the workspace, and installing one or more applications onto the base OS layer in which the applications have been installed on the workspace of a previous login session. The system may then virtually map application data to the memory of the workspace to be used by the applications in which the application data was generated by the applications during the previous login session of the workspace.

According to another embodiment, a workspace managed persistence method includes the steps of instantiating a workspace in response to receiving a login request, and creating a base OS layer in the workspace. The method also includes the steps of installing one or more applications onto the base OS layer, the applications having been installed on the workspace of a previous login session, and virtually mapping application data to the memory of the workspace to be used by the applications, the application data generated by the applications during the previous login session of the workspace.

According to yet another embodiment, a workspace orchestrator includes computer-executable instructions to instantiate a workspace in response to receiving a login request, and create a base OS layer in the workspace. The instructions may then install one or more applications onto the base OS layer, and virtually map application data to the memory of the workspace to be used by the applications. The application data has been generated by the applications, while the applications have been installed on the workspace during the previous login session of the workspace.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 4 illustrates a workflow diagram describing certain steps of an embodiment of a workspace managed persistence method that may be used to instantiate a new workspace each time a login session is established with the user according to one embodiment of the present disclosure.

DETAILED DESCRIPTION

Figure 1:
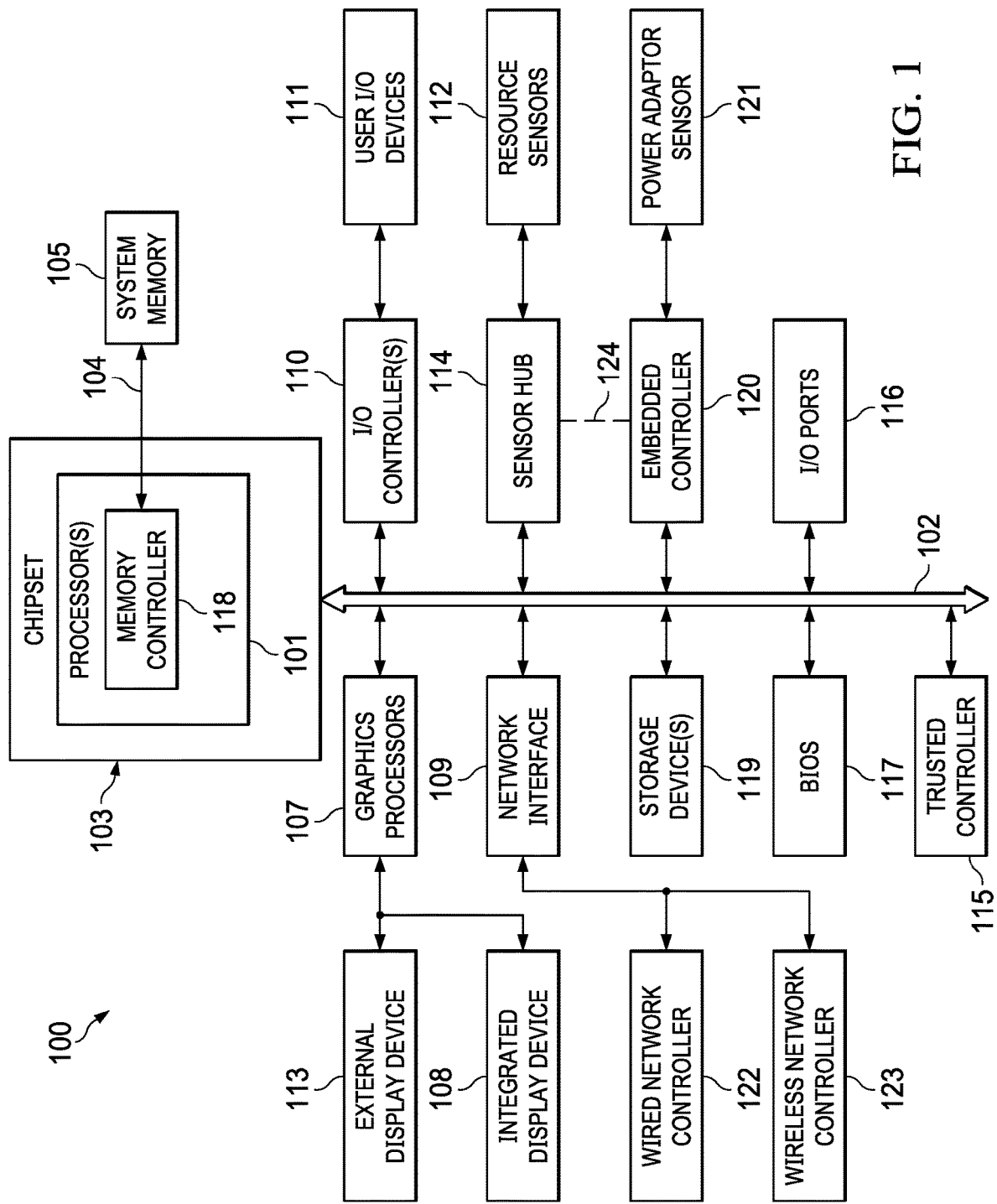
FIG. 1 is a diagram depicting components of an example IHS configured to implement systems and methods for managing persistence in a workspace environment.

Embodiments of the present disclosure provide a system and method for providing managed persistence in workspaces. Whereas conventional workspace implementations have provided persistence using various known snapshot mechanisms (e.g., Virtual Hard Disk-X (VHDX), Docker, etc.), these snapshots often include most or all of the workspace image, such as temp files, user history, along with other irrelevant files and data that clutter the workspace image over time. In many cases, this extraneous data can add significant overhead to the state of the workspace with respect to its operating environment size. This overly large size may also yield difficulties when the data needs to be secured and attested.

Given an example case where a workspace includes a word processor for productivity and a video conferencing application for interpersonal communication, the workspace will be provisioned with the applications contained in an isolated environment. Every time the user logs off the workspace, however, the snapshot is stored for the workspace with extraneous data, some of which may not be necessary and will increase foot print (e.g., memory size) of the workspace.

One solution to this problem has been to start with a clean Operating System (OS) each time and attest the user environment to ensure the integrity of the workspace contents. In such a case, however, an Information Technology Decision Maker (ITDM) has to re-provision the workspace on the machine and import user data, and settings from an external source (e.g., cloud instance), and restore the settings on the newly instantiated workspace. This scenario would require significant network resources and automation on the backend. If the user is merely interacting with a browser for cloud-native applications, such a scenario may be possible. But if the user utilizes local applications for productivity, installing those applications and restoring settings on the workspace may require a significant amount of time and effort. As such, there has heretofore existed no technique for selectively persisting workspace contexts that does not add either significant latency to workflows, and/or consume an overly large memory size on an IHS. As will be described in detail herein below, embodiments of the present disclosure provide a system and method for managed persistence of workspaces where extraneous data is reduced or eliminated each time the workspace is re-started on the IHS.

Whereas currently implemented IHSs used by consumers are configured with workspaces, such as software-based workspaces (e.g., docker), hardware-based workspaces (e.g., virtualBox, VMWare, etc.), and cloud-based workspaces, management of the applications (apps) deployed in those workspaces has heretofore remained a challenging endeavor.

Many currently available IHSs also referred to as computing devices are configured with workspaces for various reasons including enhanced isolation of applications, security improvements, and the like. Example workspaces may include software-based workspaces (e.g., docker, snap, Progressive Web application (PWA), Virtual Desktop Integration (VDI), etc.), hardware-based workspaces (e.g., Virtual Machines (VMs)), or cloud-based workspaces that are accessed from a publicly available communication network, such as the Internet. These workspaces are typically managed using orchestrators that can manage software-based workspaces, hardware-based workspaces, as well as cloud-based workspaces. Workspaces may have varying levels of performance and security KPIs running in the IHS as well as in the cloud.

It would often be useful to, with the exception of certain Operating System and vendor service applications, encapsulate most applications in a workspace for enhanced security and scalability purposes. The workspaces can be implemented using software or hardware isolation methods. The workspace persistence management system 200 provides a solution to these problems, by re-instantiating a workspace each time a login session is started, and configuring the newly instantiated workspace with environment variable for re-creating the workspace environment for the user.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100 configured to implement systems and methods for managing persistence in a workspace environment. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes storage devices 119 that may include a portion of the system memory designated for storage of information, such as access policies, component signatures, encryption keys, and other cryptographic information, etc. In such embodiments, a signature may be calculated based on the contents of storage devices 119 and stored as a reference signature. The integrity of the data stored in storage devices 119 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH.

Chipset 103 may also provide access to one or more display device(s) 108, 113 via graphics processor 107. In certain embodiments, graphics processor 107 may be comprised within one or more video or graphics cards or an embedded controller 120 installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) may include integrated display devices 108 and/or external display devices 113 coupled to IHS 100. In certain embodiments, graphics processor 107 may be integrated within processor 101. The one or more display devices 108, 113 coupled to IHS 100 may utilize LCD, LED, OLED, or other thin film display technologies. Each display device 108, 113 may be capable of touch input such as via a touch controller that may be an embedded component of display device 108 or 113, graphics processor 107, or a separate component of IHS 100 accessed via bus 102.

In certain embodiments, chipset 103 may utilize one or more I/O controllers 110 to access hardware components such as user I/O devices 111 and resource sensors 112. For instance, I/O controller 110 may provide access to user I/O devices 111 such as a keyboard, mouse, touchpad, touchscreen and/or other peripheral input devices. User I/O devices 111 may interface with I/O controller 110 through wired or wireless connections. Resource sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, IR sensors, photosensors, proximity sensors, distance sensors, magnetic sensors, microphones, ultrasonic sensors, etc.).

In some cases, chipset 103 may include a sensor hub 114 capable of utilizing information collected by resource sensors 112 in determining the relative orientation and movement of IHS 100. For instance, the sensor hub 114 may utilize inertial movement sensors, which may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub 114 may also include capabilities for determining a location and movement of IHS 100 based on triangulation of network signal and based on network information provided by the OS or network interface 109. In some embodiments, the sensor hub 114 may support additional sensors, such as optical, infrared and sonar sensors, that may provide support for xR (virtual, augmented, and/or mixed reality) sessions hosted by the IHS 100 and may be used by the sensor hub 114 to provide an indication of a user's presence near IHS 100, such as whether a user is present, absent, and/or facing integrated display device 108.

In cases where the end-user is present before IHS 100, the sensor hub 114 may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, the sensor hub 114 may utilize one or more mode resource sensors 112 that collect readings that may be used in determining the posture in which IHS 100 is physically configured. In certain embodiments, such posture determinations may additionally be made using the movement and orientation information provided by resource sensors 112. In laptop and convertible laptop embodiments, for example, processor 101 may utilize a lid position resource sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 may provide collected lid position information, such as the hinge angle, to the sensor hub 114 for use in determining the posture in which IHS 100 is configured. In some embodiments, the sensor hub 114 may interface directly with the lid position sensor in determining hinge angle information.

The sensor hub 114 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub 114 may additionally utilize orientation and movement information collected from inertial movement resource sensors 112 to further determine the posture in which IHS 100 is physically configured. For instance, if the sensor hub 114 determines that IHS 100 is configured with a hinge angle of a laptop configuration, but IHS 100 is oriented on its side, the IHS 100 may be determined to be in a book mode. If IHS 100 is determined to be tilted such that the hinge is oriented between horizontal and vertical, the user's face is detected to be facing the integrated display, and IHS 100 is experiencing slight movement, the sensor hub 114 may determine that IHS 100 is being used in a book posture. The sensor hub 114 may determine that IHS 100 is opened to a 180-degree hinge angle and lies on a flat surface, thus indicating that IHS 100 it is being used in a landscape posture. The sensor hub 114 may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O ports 116 may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. Access to storage devices via an I/O port 116 may result in a change in the security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. Upon execution, BIOS 117 instructions may facilitate the loading of an OS (e.g., WINDOWS, MACOS, iOS, ANDROID, LINUX, etc.) for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox. In such an implementation, the mailbox may provide a secured storage location for use in storing access policies, signatures, cryptographic keys, or other data. In certain embodiments, the BIOS mailbox may be utilized as a secure storage utilized by a remote orchestration service in order to store access policies and cryptographic keys for use in delivering and deploying a secured container on IHS 100.

In certain embodiments, trusted controller 115 is coupled to IHS 100. For example, trusted controller 115 may be an embedded controller (EC) that is installed as a component of the motherboard of IHS 100. Trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage as a reference signature.

Trusted controller 115 may be further configured to recalculate a hash value at a later time for such a component. The hash value recalculated for the component may then be compared against the reference hash value signature to determine if any modifications have been made to a component, thus indicating the component has been compromised. In this manner, trusted controller 115 may be used to validate the integrity of hardware and software components installed on IHS 100.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core operations of IHS 100, such as power management and management of certain modes of IHS 100 (e.g., turbo modes, maximum operating clock frequencies of certain components, etc.).

In managing modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position resource sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support different reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These types of power modes may be entered, for example, when IHS 100 transitions into standby (e.g., "sleep," etc.).

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
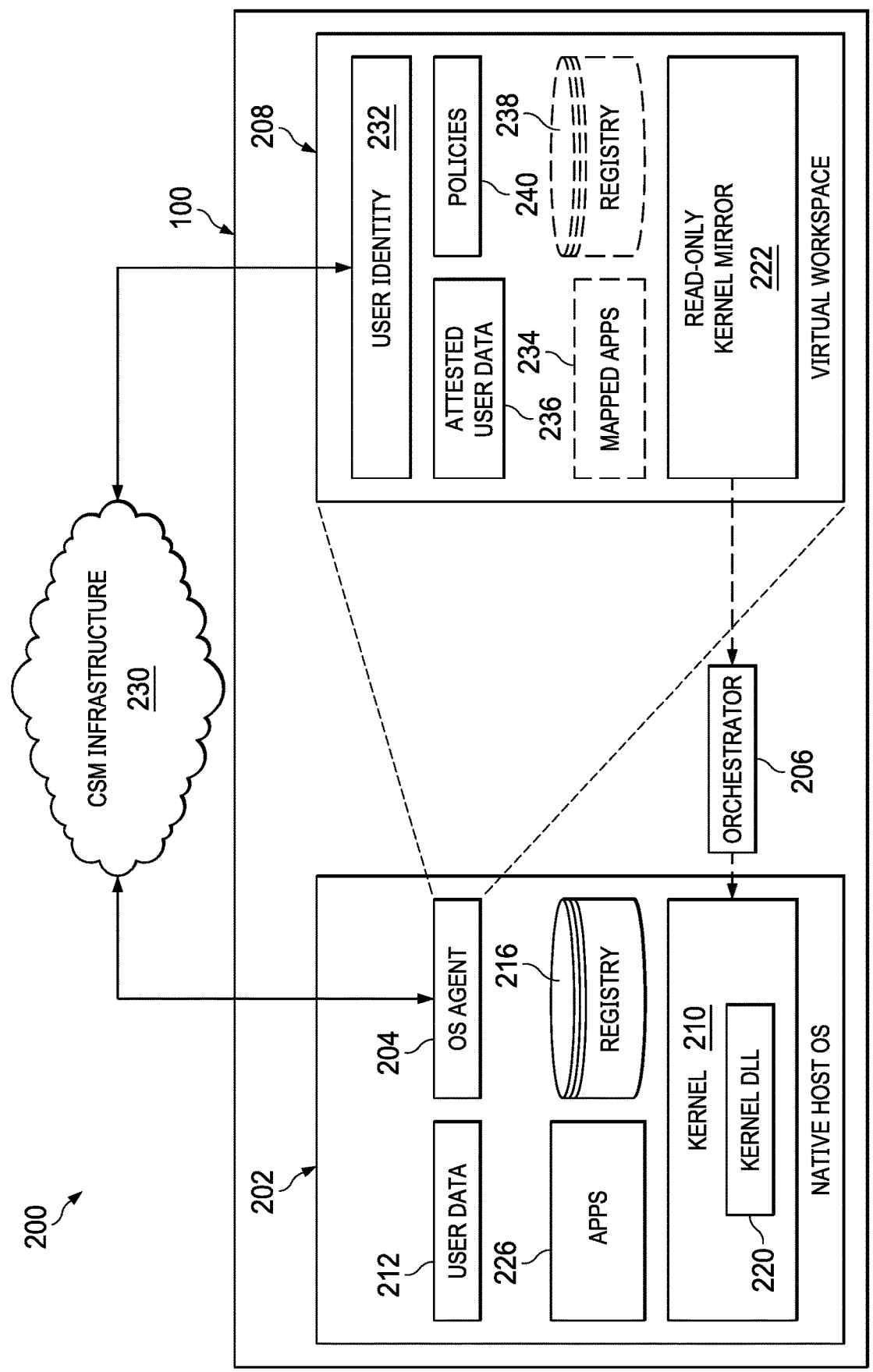
FIG. 2 is a diagram showing several components of an example workspace managed persistence system according to one embodiment of the present disclosure.

FIG. 2 is a diagram showing several components of an example workspace managed persistence system 200 according to one embodiment of the present disclosure. According to one embodiment, the system 200 may be implemented on an IHS, such as the IHS 100 as described above with reference to FIG. 1. The system 200 generally includes a native host OS 202 that supports an OS agent 204, one or more applications (APPs) 226, and an orchestrator 206 that is configured to instantiate a virtual workspace 208 on the IHS 100. The native host OS 202 also includes a kernel 210 that performs certain low level operations for the native host OS 202. Additionally, the native host OS 202 stores user data 212, and a registry 216 that may be used to provide a unique configuration for the virtual workspace 208 each time it is launched or instantiated on the IHS 100.

In general, each time the virtual workspace 208 is launched using the orchestrator 206, the OS agent 204 communicates with a converged security and management (CSM) infrastructure 230 to attest a user identity 232 of the user attempting to launch the virtual workspace 208, and upon success of the workspace attestation, installs one or more mapped applications 234 in accordance with the user's identity 232. Additionally, the OS agent 204 may copy information from the registry 216, user data 212, and other application data associated with the mapped applications 234 into a mirrored registry 238 and policies 240 to be used by the applications 234 in the virtual workspace 208. In one embodiment, the OS agent 204 may attest user data 212 and other data to create attested user data 236 that may be used by the virtual workspace 208 to re-create the user environment for the user. In another embodiment, the OS agent 204 may use keys stored in a Trusted Platform Module (TPM), such as by using a Process Monitor OS layer monitoring tool provided by the Microsoft Corporation.

According to one embodiment, a kernel DLL 220 is provided that includes executable logic for creating a read-only kernel mirror 222 of the local kernel 210 stored in the native host OS 202. The read-only kernel mirror 222 is accessible by the applications and other processes stored in the virtual workspace 208 in that it allows the applications and other processes to access the memory contents of the kernel 210 as if it were stored in the virtual workspace 208. In one embodiment, the read-only kernel mirror 222 generally comprises a data structure created by a memory manager of the native host OS 202 to map a region of the kernel 210 memory to the private address space of the virtual workspace 208. In some respects, the read-only kernel mirror 222 may be construed as a mailbox in which secure data may be transferred to and from the kernel 210. More specifically, the memory manager of the native host OS 202 marks the read-only kernel mirror 222 as invalid from a typical processing perspective, but generates private memory mapped file access information (e.g., hooks or handles) that allows access to the contents of the read-only kernel mirror 222 by the virtual workspace 208. Thus, the contents of the read-only kernel mirror 222 are inaccessible by entities that do not have access to the private memory mapped file access information while being accessible to components on board the virtual workspace 208.

The orchestrator 206 may be any suitable type that manages operation of workspaces 208 on the IHS 100. For example, the orchestrator 206 may be a type-1, native, or bare-metal hardware hypervisor running directly on IHS 100 to manage the virtual workspace 208. In other implementations, the orchestrator 206 may be a type-2 or hosted hypervisor running on top of host OS 202. The orchestrator 206 may instantiate any type of virtual workspace 208, such as a hardware-based workspace (e.g., a Virtual Machine (VM)). Additionally, or alternatively, the orchestrator 206 may instantiate a software-based workspace, such as a docker, snap, Progressive Web application (PWA), INTEL Clear Container workspace. In some embodiments, when applications are distributed and/or deployed from a trusted source, a software-based workspace may be used as it generally has less overhead and provides higher containerized application density. Conversely, when applications are distributed and/or deployed from an untrusted source, a hardware-based and/or hypervisor-isolated workspace 206 may be used, despite presenting a higher overhead, to the extent it provides better isolation or security. Software-based workspaces may share the kernel 210 of native host OS 202 and UEFI services, but access may be restricted based upon the user's privileges. Hardware-based workspaces may have a separate instance of OS and UEFI services. In both cases, software-based and hardware-based workspaces serve to isolate applications from native host OS 202 and other applications.

Figure 3:
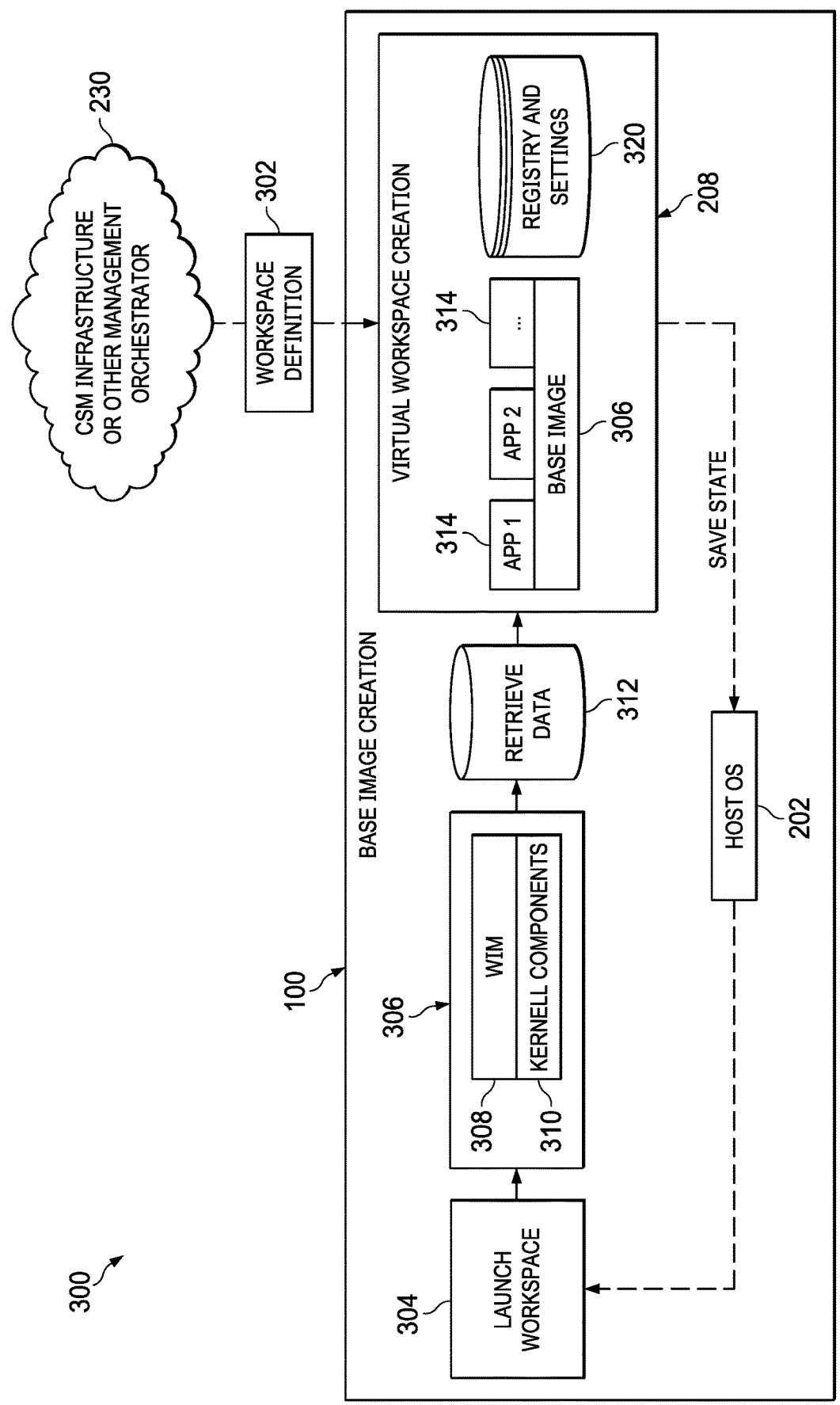
FIG. 3 is a diagram of another example workspace managed persistence system showing how a new workspace may be re-created each time a login session is established according to one embodiment of the present disclosure.

FIG. 3 is a diagram of another example workspace managed persistence system 300 showing how a new workspace may be re-created each time a login session is established according to one embodiment of the present disclosure. The system 300 may be provided by a computing environment, such as the IHS 100 as described above with reference to FIG. 1.

In one embodiment, the virtual workspace 208 may be configured according to a workspace definition 302. The workspace definition 302 refers to a collection of attributes that describe aspects a workspace that may be assembled, initialized, deployed and/or operated on the IHS 100. For example, the workspace definition 302 may include information associated with a particular user who is authorized to launch the virtual workspace 208 as well as any applications that may be allocated for use by the user on that virtual workspace 208. The workspace definition 302 may also include information from the registry 320, application data, and/or user data that may be used to re-create the computing environment for the user each time the workspace is launched.

The system 300 is provided with a workspace launch icon 304, that when selected by the user, causes instantiation of the virtual workspace 208 to begin. For example, the native host OS 202 may present the icon 304 on a display of the IHS 100 that when selected, causes the native host OS 202 to commence instantiation of the virtual workspace 208. Once the workspace launch icon 304 is selected, the orchestrator 206 creates a base OS layer 306. That is, the orchestrator 206 installs a new OS image and associated kernel in the newly instantiated virtual workspace 208. In one embodiment, the base OS layer 306 may include a disk image 308 of a host operating environment that includes a base kernel 310 and any dependent libraries. For example, the disk image may be an Open Source Windows Imaging Format (WIM) file-based disk image format.

If the virtual workspace 208 is being launched for the first time, the orchestrator 206 may retrieve application data associated with those applications allocated for use with the virtual workspace 208 from the workspace definition 302. If, however, the virtual workspace 208 is being launched after a previous login session, the orchestrator 206 may retrieve data 312 associated with the previous instantiation of the virtual workspace 208 on the IHS 100. For example, the orchestrator 206 may retrieve application data associated with any settings or configuration of the applications 314 that were used in the previous workspace login session. The orchestrator 206 may also retrieve user data associated with any particular user settings that have been made to the previously launched virtual workspace 208. The orchestrator 206 may also retrieve settings in the registry 320, which were made inside of the virtual workspace 208 during its previous login session.

The orchestrator 206 may also install the applications 314 on the base image 306. For example, when a login session of the virtual workspace 208 is launched subsequent to a previous workspace login session, the orchestrator 206 may access the CSM infrastructure 230 to determine which applications 314 are allocated for use with that virtual workspace 208, and install those applications 314 on the base image 306.

The login session of the currently running virtual workspace 208 may be terminated at any time by the user. When the login session is terminated, the orchestrator 206 may save data (e.g., application data, user data, registry settings, etc.) associated with the configuration or settings of the virtual workspace 208 in the native host OS 202. Thus, when the virtual workspace 208 again launched at a future point in time, those settings may be retrieved for instantiating a new virtual workspace 208 with the settings from the previous login session.

FIG. 4 illustrates a workflow diagram describing certain steps of an embodiment of a workspace managed persistence method 400 that may be used to instantiate a new workspace each time a login session is established with the user according to one embodiment of the present disclosure. Additionally or alternatively, certain steps of the method 400 may be performed by the workspace persistence management system 200, 300 described herein above. Although only one virtual workspace 208 is described in the method 400, it should be understood that the method 400 can be practiced with any quantity of workspaces 208, such as two or more workspaces 208 that may be managed by an orchestrator 206. Initially, OS agent 204, orchestrator 206, and kernel DLL 220 have been loaded on an IHS 100, and no virtual workspace 208 has yet been launched or instantiated.

At step 402, the orchestrator 206 generates an initial virtual workspace 208 as a result of creation of an initial login session with a user. In one embodiment, the orchestrator 206 may access the CSM infrastructure 230 to determine any access rights, or allocated applications that the user may have rights to. The initial virtual workspace 208 may include a base operating environment including a base kernel and any dependent libraries. In a particular embodiment, the base operating environment comprises an Open Source Windows image format (WIM) disk image.

At step 404, the orchestrator 206 sends information associated with the newly instantiated virtual workspace 208 to the OS agent 204. The orchestrator 206 may also attest the newly instantiated virtual workspace 208 to the OS agent 204 so that it can vouch for the identity of the user with the virtual workspace 208. The OS agent 204, in turn, configures the kernel DLL 220 for attesting the data (e.g., application data, user data, registry settings, etc.) associated with the configuration or settings of the virtual workspace 208 in the native host OS 202 at step 406. At this point, the virtual workspace 208 has been initially instantiated, and is installed with one or more applications 314 for use by the user.

Steps 408-424 generally describe actions that may be taken to repeatedly launch and terminate subsequent login sessions. In particular, steps 408-414 describe actions that may be taken to terminate a virtual workspace 208, while steps 416-424 describe actions that may be taken to instantiate a new virtual workspace 208 using workspace operating environment data stored for that virtual workspace 208 during a previous login session.

At step 408, the OS agent 204 receives a request to terminate the currently running virtual workspace 208. The termination request could be initiated by the user, or by the orchestrator 206 such as, for example, due to a triggering event in which the virtual workspace 208 is no longer going to be used. In some respects, terminating the virtual workspace 208 could be considered to be somewhat similar to a hibernation technique where the virtual workspace 208 is no longer generating a processing load, but includes information for re-establishing a new virtual workspace 208 with an operating environment similar to the virtual workspace 208 used in the previous login session.

Before the virtual workspace 208 is terminated, the OS agent 204 requests user environment attestation context from the virtual workspace 208 via the kernel DLL 220 at step 410. That is, the OS agent 204 obtains data (e.g., application data, user data, registry settings, etc.) associated with the configuration or settings of the virtual workspace 208. Thereafter at step 412, the OS agent 204 receives the requested attestation data from the kernel DLL 220 of the virtual workspace 208, and stores the context data in the native host OS 202 via the orchestrator 206 at step 414. At this point, the virtual workspace 208 instantiated at steps 402-406 no longer exists and will no longer be instantiated by the system.

At some time later at step 416, the OS agent 204 receives a request to launch a new virtual workspace 208 based upon context data received and stored earlier at step 414. The workspace launch request could be initiated by the user, or by the orchestrator 206 for any suitable reason. In some respects, the launch request may be considered to somewhat similar to resumption of workspace operation in which the virtual workspace 208 is re-started, but with a new operating environment and newly installed applications 314.

At step 418, OS agent 204 requests the workspace context (e.g., application data, user data, registry settings, etc.) from the orchestrator 206, and at step 420, receives the requested workspace context. Thereafter at step 422, the OS agent 204 configures the stored workspace context in the newly instantiated base OS 306 so that the user may have a similar operating environment to the previously instantiated virtual workspace 208. In one embodiment, the OS agent 204 configures the workspace context using the kernel DLL 220. The orchestrator 206 then attests the workspace context to verify the integrity of the operating environment of the newly launched virtual workspace 208 at step 424.

Steps 408-424 may be repeatedly performed for continual hibernation and resumption of operation of the virtual workspace 208 on the IHS 100. Nevertheless, when use of the workspace managed persistence method 400 is no longer needed or desired, the method 400 ends.

Although FIG. 4 describes an example method that may be performed to instantiate a new workspace each time a login session is established with the user, the features of the method 400 may be embodied in other specific forms without deviating from the spirit and scope of the present disclosure. For example, the method 400 may perform additional, fewer, or different operations than those described in the present examples. As another example, certain steps of the aforedescribed method 400 may be performed in a sequence different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
    at least one memory including instructions that, upon execution by at least one processor, cause the IHS to:
    each time a login request for a new login session is received:
        instantiate a workspace;
        create a base OS layer in the workspace;
        install one or more applications onto the base OS layer, the applications having been installed on the workspace of a previous login session;
        virtually map application data to the memory of the workspace to be used by the applications, the application data generated by the applications during the previous login session of the workspace; and
        import a snapshot of registry data into the workspace, the snapshot taken from the registry data of a previous login session of the workspace.

2. The IHS of claim 1, wherein the instructions further cause the IHS to attest the registry data based on the previous login session.

3. The IHS of claim 1, wherein the instructions further cause the IHS to map the registry data to a read-only mirror in the workspace.

4. The IHS of claim 1, wherein the instructions further cause the IHS to attest the application data based on the previous login session.

5. The IHS of claim 4, wherein the instructions further cause the IHS to attest the application data using keys stored in a Trusted Platform Module (TPM).

6. The IHS of claim 1, wherein the instructions further cause the IHS to import user data into the workspace, the user data obtained from a previous login session of the workspace.

7. The IHS of claim 1, wherein the base OS layer comprises a base kernel and one or more kernel library components.

8. A workspace managed persistence method comprising:
    each time a login request for a new login session is received:
        instantiating, using instructions stored in at least one memory and executed by at least one processor, a workspace;
        creating, using the instructions, a base OS layer in the workspace;
        installing, using the instructions, one or more applications onto the base OS layer, the applications having been installed on the workspace of a previous login session;
        virtually mapping, using the instructions, application data to the memory of the workspace to be used by the applications, the application data generated by the applications during the previous login session of the workspace; and
        importing a snapshot of registry data into the workspace, the snapshot taken from the registry data of a previous login session of the workspace.

9. The workspace managed persistence method of claim 8, further comprising mapping the registry data to a read-only minor in the workspace.

10. The workspace managed persistence method of claim 8, further comprising attesting the application data based on the previous login session using keys stored in a Trusted Platform Module (TPM).

11. The workspace managed persistence method of claim 8, further comprising importing user data into the workspace, the user data obtained from a previous login session of the workspace.

12. A non-transitory computer readable medium comprising program instructions stored thereon that, upon execution by an Information Handling System (IHS), cause the IHS to:
    each time a login request for a new login session is received:
        instantiate a workspace;
        create a base OS layer in the workspace;
        install one or more applications onto the base OS layer, the applications having been installed on the workspace of a previous login session;
        virtually map application data to the memory of the workspace to be used by the applications, the application data generated by the applications during the previous login session of the workspace; and
        import a snapshot of registry data into the workspace, the snapshot taken from the registry data of a previous login session of the workspace.

13. The non-transitory computer readable medium of claim 12, wherein the instructions further cause the IHS to map the registry data to a read-only mirror in the workspace.

14. The non-transitory computer readable medium of claim 12, wherein the instructions further cause the IHS to attest the application data based on the previous login session.

15. The non-transitory computer readable medium of claim 14, wherein the instructions further cause the IHS to attest the application data using keys stored in a Trusted Platform Module (TPM).

16. The non-transitory computer readable medium of claim 12, wherein the instructions further cause the IHS to import user data into the workspace, the user data obtained from a previous login session of the workspace.

17. The non-transitory computer readable medium of claim 12, wherein the base OS layer comprises a base kernel and one or more kernel library components.

* * * * *